Oct. 25, 1949.  O. H. EBERLEIN ET AL  2,485,716
AUTOMATIC TEMPLATE CONTROLLED MACHINE TOOL

Filed Nov. 5, 1945  11 Sheets-Sheet 1

Fig. 1

Inventors
Otto H. Eberlein &
Leo L. Young
By Blackmon, Spencer & Flint
Attorneys Oct. 25, 1949.  O. H. EBERLEIN ET AL  2,485,716
AUTOMATIC TEMPLATE CONTROLLED MACHINE TOOL
Filed Nov. 5, 1945                                   11 Sheets-Sheet 2

Inventors
Otto H. Eberlein &
Leo L. Young

Oct. 25, 1949.  O. H. EBERLEIN ET AL  2,485,716
AUTOMATIC TEMPLATE CONTROLLED MACHINE TOOL

Filed Nov. 5, 1945  11 Sheets-Sheet 5

Oct. 25, 1949.    O. H. EBERLEIN ET AL    2,485,716
AUTOMATIC TEMPLATE CONTROLLED MACHINE TOOL
Filed Nov. 5, 1945    11 Sheets-Sheet 6

Fig. 10

Oct. 25, 1949.　　　　O. H. EBERLEIN ET AL　　　　2,485,716
AUTOMATIC TEMPLATE CONTROLLED MACHINE TOOL
Filed Nov. 5, 1945　　　　　　　　　　　　　　　　11 Sheets-Sheet 9

Inventors
Otto H. Eberlein &
Leo L. Young
By Blackmore, Spencer & Flint
Attorney Oct. 25, 1949.  O. H. EBERLEIN ET AL  2,485,716
AUTOMATIC TEMPLATE CONTROLLED MACHINE TOOL
Filed Nov. 5, 1945  11 Sheets-Sheet 11

Inventors
Otto H. Eberlein &
Leo R. Young
By Blackmore, Spencer & Flint
Attorneys Patented Oct. 25, 1949

2,485,716

UNITED STATES PATENT OFFICE 2,485,716

AUTOMATIC TEMPLATE CONTROLLED MACHINE TOOL

Otto H. Eberlein, Lakewood, and Leo L. Young, Cleveland, Ohio, assignors to General Motors Corporation, Detroit, Mich., a corporation of Delaware Application November 5, 1945, Serial No. 626,704

10 Claims. (Cl. 90—24.3)

1

This invention relates to machine tools and more particularly to template controlled means for such machines whereby helical surfaces are accurately formed.

The principal object of the invention is an arrangement of template controlled means for automatically adjusting the cutting tool of a machine in one plane and for controlling oscillation of a workpiece on a machine element movable transversely to the plane of adjustment of the cutting tool so that a smooth helical surface may be quickly and accurately formed on the workpiece corresponding exactly to that of the templates and requiring no additional hand scraping or filing.

The novel features of the arrangement of template controlled means by which the above and other objects are accomplished will become apparent by reference to the following detailed description and drawings illustrating these means applied to a machine tool of the planer-shaper type for forming three lobe helical blower rotors of the Roots type by use of either the single or double cutting stroke method.

Figures 10 to 14 show modifications in certain of the elements illustrated in the preceding figures whereby each stroke of the work supporting table of the machine becomes a cutting stroke.

2

The machine tool illustrated generally in Figures 1, 2, 4 and 5 is a conventional hydraulically actuated shaper-planer. The machine comprises a bed 1 on which a work supporting table 3 is longitudinally reciprocated by hydraulic means in conventional manner, a column 5 secured to the bed and supporting a combined column slide and cross rail 7 extending transversely to the table on which a saddle 9 is slidably mounted and a tool support slide 11 supported on the saddle 9 for vertical movement.

Figure 6:
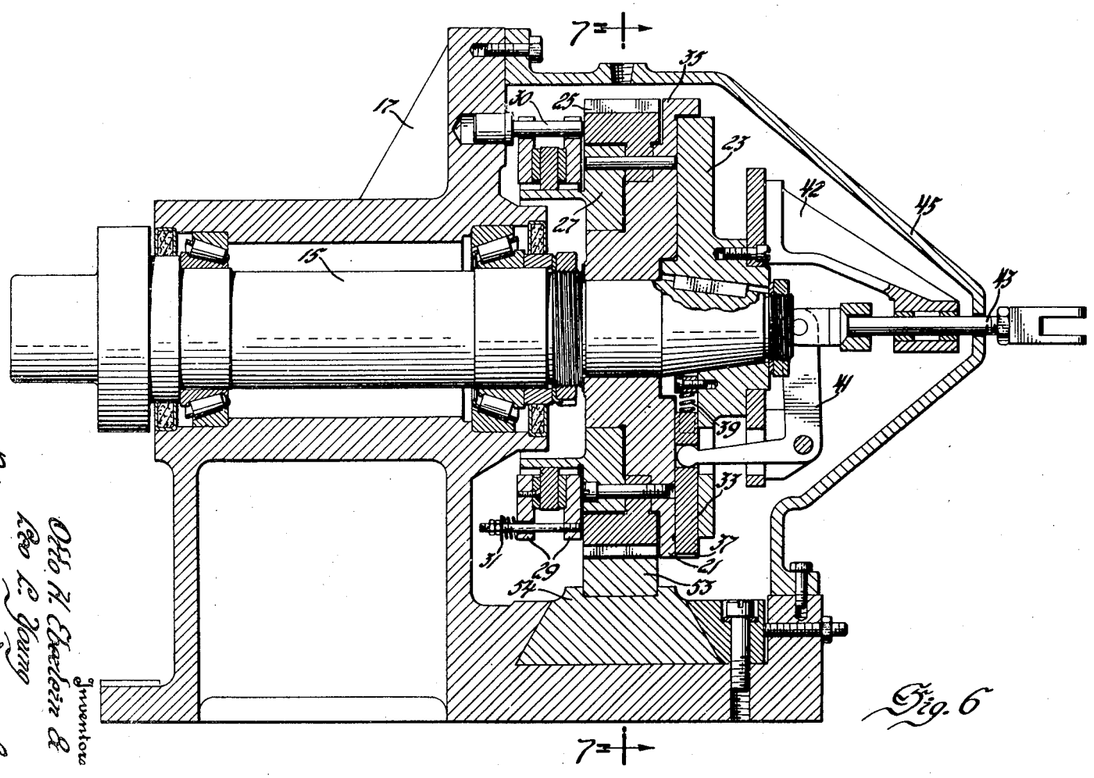
Figure 6 is a vertical sectional view taken on line 6—6 of Figure 5 showing a detail of the machine.

The work and tool suporting means and template controlled positioning means therefor provided on the machine by which a three lobe helical surface is automatically formed on a workpiece 13 to serve as a Roots blower rotor will now be described. The workpiece 13 is secured at one end on a mandrel 15 which, as best illustrated in Figure 6, is rotatably supported in a headstock housing 17 by means of axially spaced antifriction thrust bearings. The headstock housing and a tailstock 19, including an adjustable center, not shown, on which the other end of the workpiece is rotatably supported, are secured to the table 3 so that the workpiece is capable of oscillation about the axis of the mandrel 15, which axis is parallel to the path of longitudinal movement of the table. A flanged supporting member 21 is rotatably supported on the inner end of the mandrel between one bearing and a flange 23 secured on the tapered end portion of the mandrel. A gear 25 and a brake drum 27 are secured to the periphery and the inner face, respectively, of the flanged support member 21 and brake discs 29 are anchored by pins 30 to the headstock housing 17 and are frictionally engaged by springs 31 with a flange of the brake drum 27. An indexing key 33 is slidably mounted in a radial groove in the inner face of the flange 23 adjacent the flanged support member 21 which is provided with an annular flange 35 having three indexing slots 37 located 120 degrees apart and extending radially therethrough. Each slot has one side displaced angularly with the center line into which the outer tapered end of the index key 33 is normally urged and wedged by springs 39 placed in the inner end of the indexing key supporting groove of the flange 23, as best illustrated in Figures 6, 13 and 15.

Figure 1:
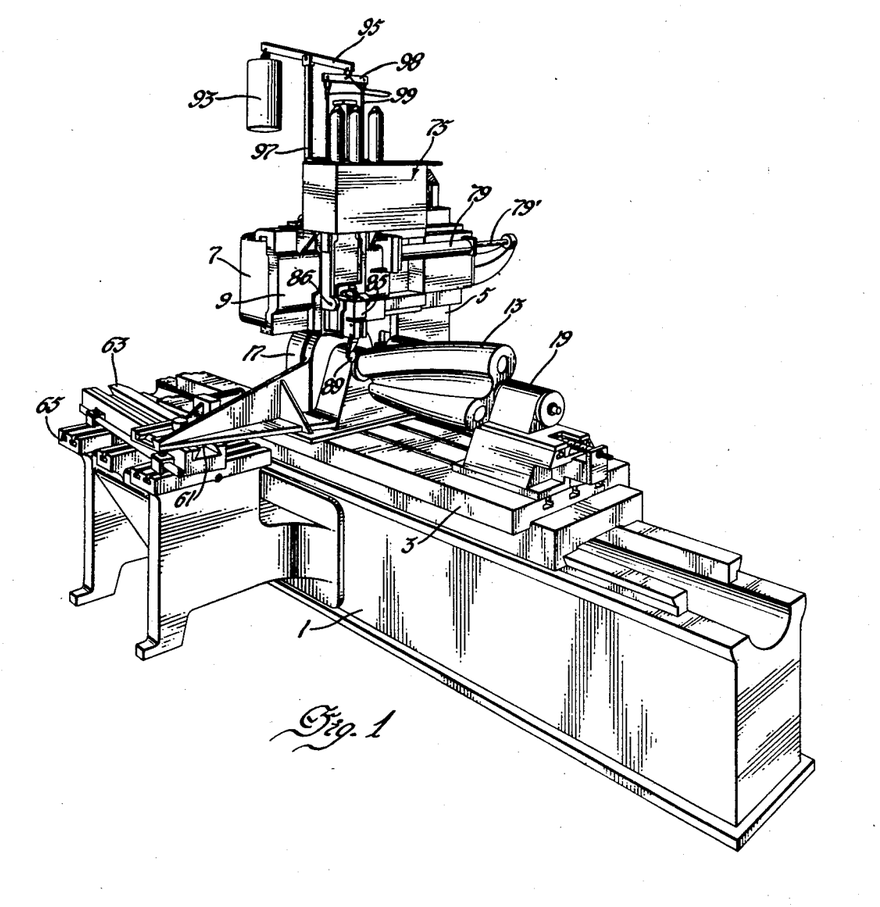
Figure 1 is a perspective view of a conventional hydraulically operated shaper-planer machine tool provided with our template controlled means for forming helical surfaces on alternate strokes of the work supporting table of the machine.
Figure 5:
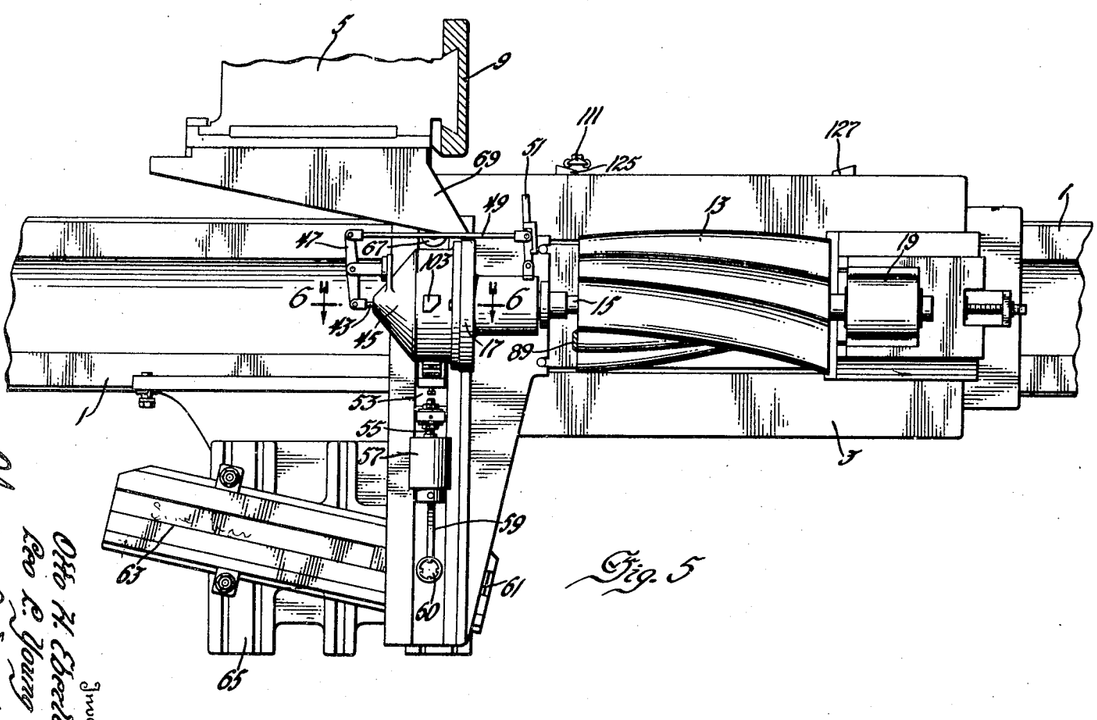
Figure 5 is a view taken on line 5—5 of Figure 2.
Figures 7, 8:
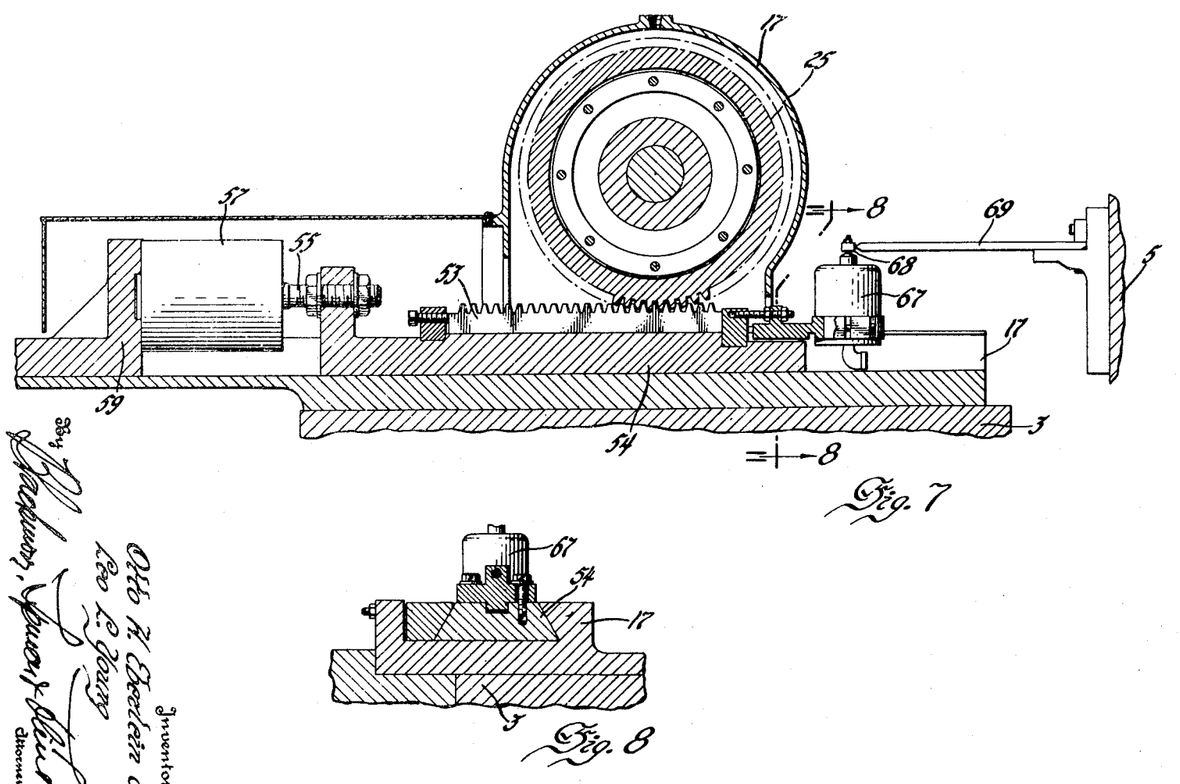
Figure 7 is a transverse sectional view taken on line 7—7 of Figure 6 with parts broken away.
Figure 8 is a longitudinal sectional view taken on lines 8—8 of Figure 7 with parts broken away.
Figure 13:
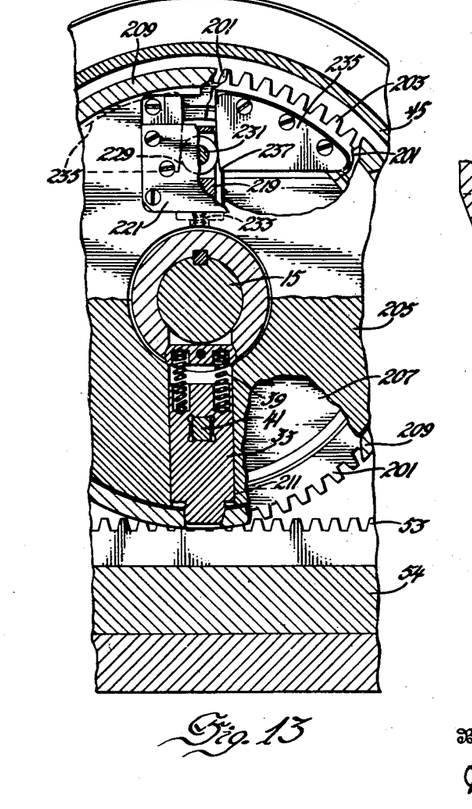
Figures 13 and 14 are sectional views taken on lines 13—13 and 14—14, respectively, of Figure 15 with parts broken away.
Figures 14, 15:
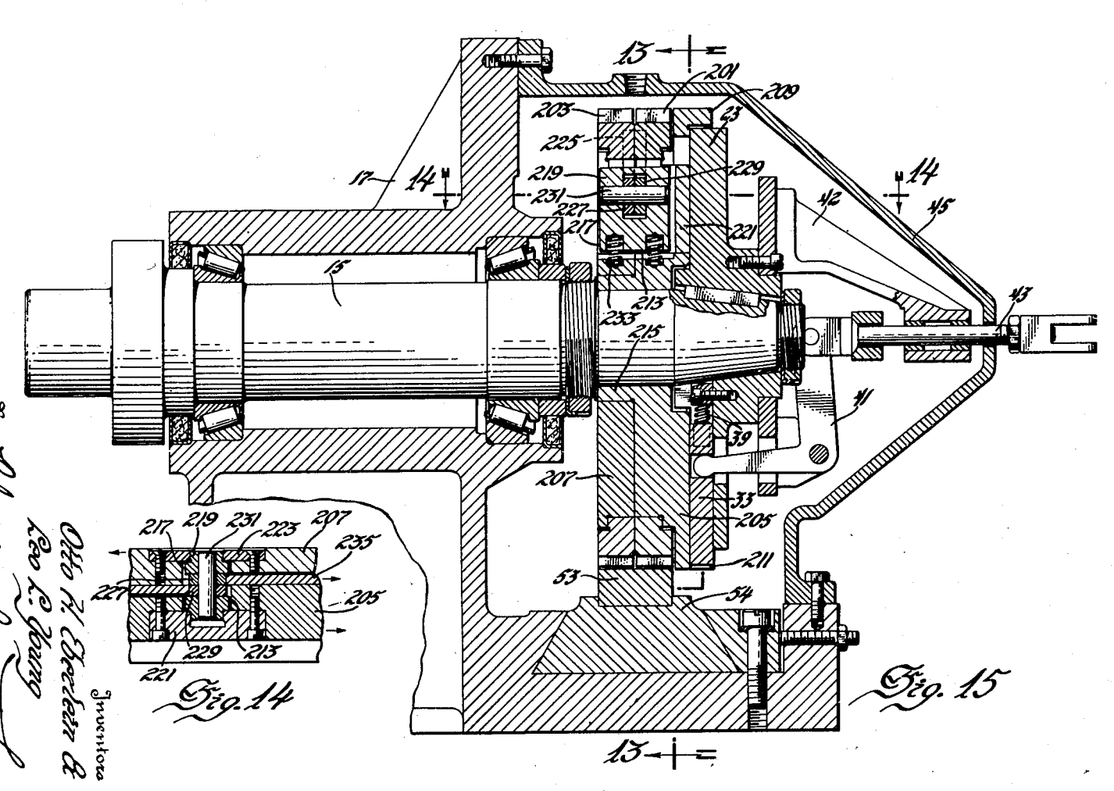
Figure 15 is a view similar to Figure 6 with certain parts modified.

Indexing key releasing means shown in Figures 5, 6 and 13 are provided for moving the indexing key 33 radially inwardly out of either the indexing slots 37 so that the mandrel 15, workpiece 13 and flange 23 may be manually indexed to and then locked in either of three indexing positions located 120 degrees apart with respect to the flanged support member 21 in order to form one-third of a three lobe helical surface on the workpiece for each indexing position. This releasing means comprises a bell crank 41 pivotally mounted on a bracket 42 secured to the flange 23 and having one arm projecting into a slot in the indexing key 33 and the other arm connected by a swivel connection to a link 43 slidably mounted in the bracket 42 for coaxial movement with respect to the mandrel. The link 43 projects outwardly through an opening in an end closure cap 45 secured to the headstock housing 17. As best shown in Figure 5 the outer end of the link 43 is connected by means of a lever 47 fulcrumed on the housing cap 45 and another link 49 to a hand lever 51 pivoted to the housing and provided with a removable handle. The hand lever when moved toward the rotor or workpiece 13 accordingly releases the indexing key 33 from either of the indexing slots 37 to permit manual indexing of the rotor, mandrel and flange thereon with respect to the gear 25 and gear support member 21. A rack 53 meshes with the is mounted for transverse sliding movement in a gear and is adjustably secured to a slide 54 which is mounted for transverse sliding movement in a guide slot in the headstock housing 17. As best shown in Figures 1, 5 and 7, the slide 54 is connected to a piston rod 55 having a piston thereon, not shown, which piston is slidable in a hydraulic cylinder 57 secured to another slide 59. The slide 59 is also slidable in a transverse slot in an extension of the headstock housing 17 and is pivotally connected at 60 to a follower slide 61 which is slidably mounted in a groove of a sine bar 63. The sine bar 63 is mounted for angular adjustment on a bracket 65 secured to the machine bed 1. Relative movement of the piston and piston rod 55 with respect to the cylinder 57 is controlled by a tracer valve 67 adjustably secured to the slide 54 and having a movable element 68 shown in engagement with a sine template 69 which is secured to the column 5 of the machine in proper position for forming right-hand helical rotor surfaces. This template 69 is secured in opposite end to end relation in forming left-hand rotor surfaces.

The sine template tracer valve 67 and cylinder 57 and hydraulic control connections, not shown, are conventional and serve in a well known manner to cause the rack to exactly follow the sine template 69 by movement of the piston relative to the cylinder 57, sine bar follower 61 and slide 59 in response to any slight movement of the movable element 68 of the tracer valve 67 with respect to the rack 53 in following the sine template 69 due to errors in the sine bar 63 or angular setting thereof or on account of any lost motion between the gear 25 and rack 53 and between the sine bar 63 and follower slide 61. The braking force between the brake discs 29 and drum 27 prevents overrun of the mandrel 15 and workpiece 13 thereon due to their inertia and the tracer valve 67 is adjusted relative to the sine template 69 and/or the sine bar 63 is adjusted angularly with respect to the sine template 69 so that one side of the teeth of the rack 53 are maintained continuously in engagement with one side of the teeth of the gear 25.

Figure 2:
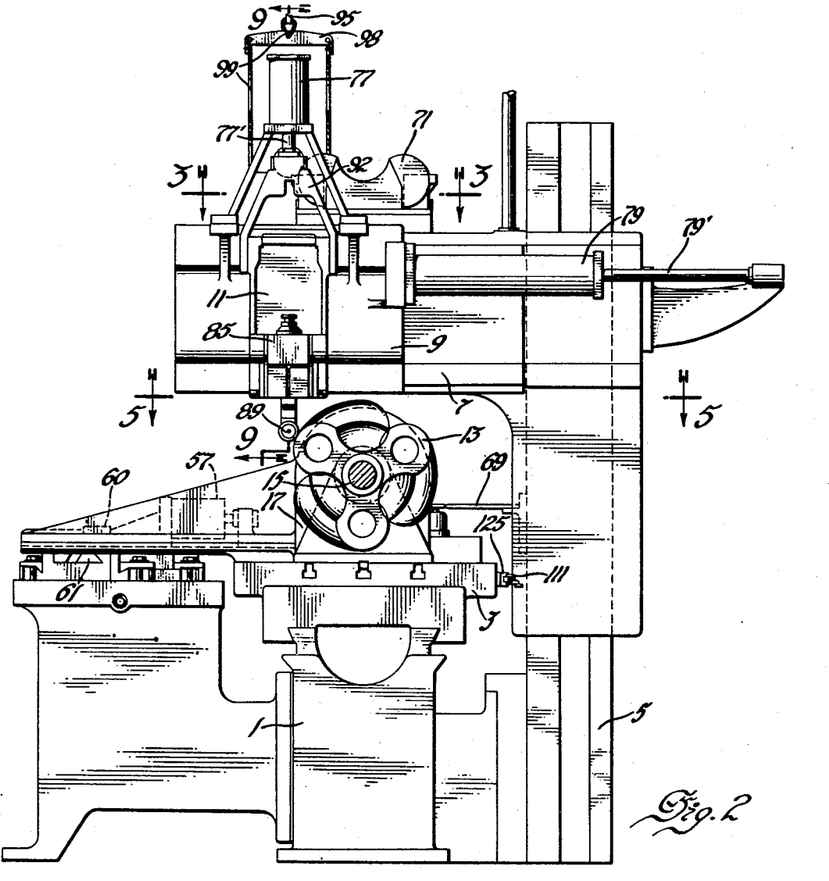
Figure 2 is an end elevation view of the machine shown in Figure 1.
Figure 9:
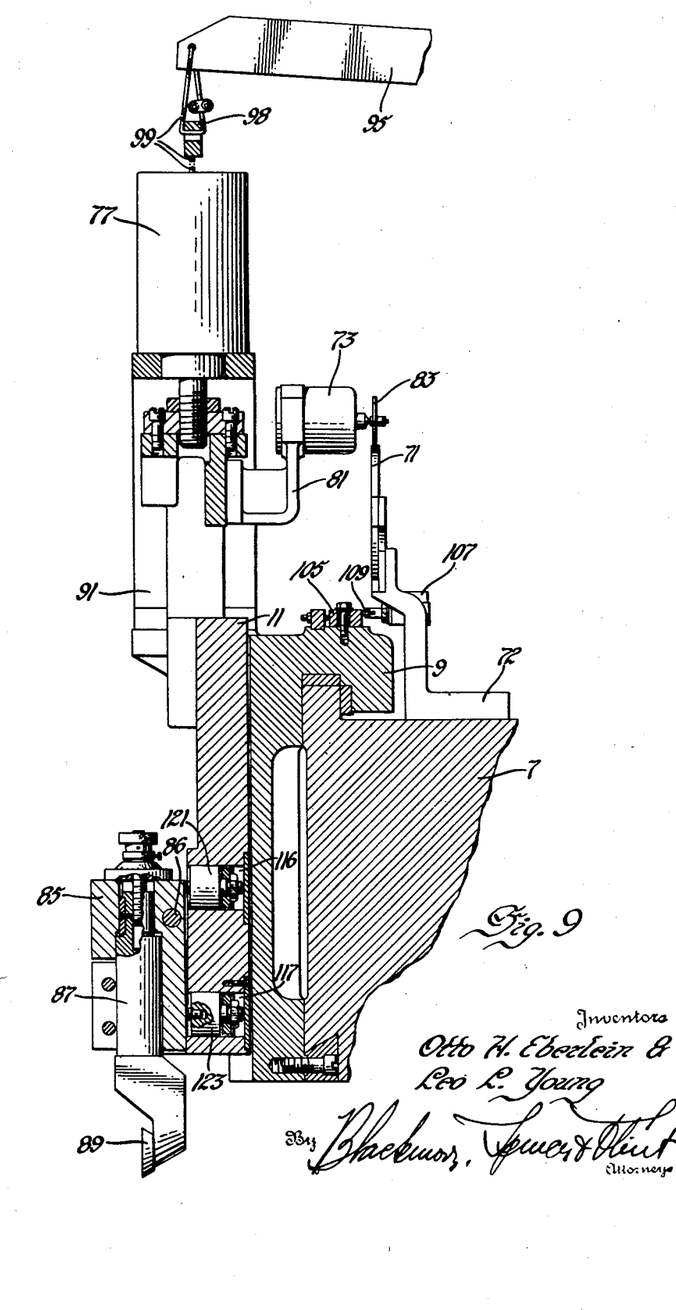
Figure 9 is a longitudinal sectional view taken on lines 9—9 of Figure 2.

For each indexing position of the workpiece 13 other template controlled means also of conventional type are provided to adjust a circular cutting tool 89 in a plane transverse to the helical path of movement of the workpiece after the finish of the cutting stroke of the table 3 in order to accurately form thereon one-third of the external surface of a three lobe helical rotor, that is one-half of each of the convex portions of adjacent lobes and the groove or concave portion therebetween. A three piece rotor template 71 of this form is secured by means of a bracket 72 on the column slide and cross rail 7, as best shown in Figures 2 and 9. The template controlled means shown in Figures 1, 2 and 9 includes a rotor template tracer valve 73, relay valve mechanisms controlled thereby indicated generally at 75 in Figure 1, for controlling two hydraulic tool feed cylinders 77 and 79, best shown in Figure 2, located at right angles to one another to cause movement of the pistons and piston rods of these cylinders in inverse relation in a well known manner whereby the cutting tool 89 is adjusted in follow-up relation to movement of the tracer valve in order to cause removal of the same amount of material from a workpiece on each cutting stroke of the table so that one-third of the surface formed on the workpiece 13 corresponds exactly to that of the rotor template 71. As best shown in Figure 9 the rotor template tracer valve 73 is secured on an upstanding bracket 81 of the tool slide 11. A rotor template follower roller 83 is rotatably mounted on the movable element of the tracer valve 73. A clapper box 85 is pivoted for tilting movement about a horizontal pivot pin 86 on the lower end of the tool slide 11 and a tool post 87 secured in the clapper box supports the circular cutting tool 89 which is the same diameter as the template follower roller 83. The vertical tool feed cylinder 77 is secured in a vertical position by means of a bracket 91 to the saddle 9 and the piston rod 77' extending downwardly therefrom is connected by a bracket 92 to the tool slide 11 to cause vertical feed of the cutting tool 89. The weight of the tool slide 11 and parts secured thereto is counterbalanced by a counterweight 93 pivoted on one end of a lever 95 fulcrumed by a swivel connection to a post 97 secured to the cross rail 7. The other end of the lever 95 is connected by a bar 98 and flexible cables 99 to bracket 92 on the tool slide. The other or transverse tool feed cylinder 79 is secured in a horizontal position to the saddle 9 and the piston rod 79' extending therefrom is connected to the combined column slide and cross rail 7 in order to normally move the saddle 9 and cutting tool 89 transversely to the right of the positions shown in the various figures of the drawings. This is the normal transverse feed stroke of the tool relative to the reciprocating table 3 and oscillating workpiece 13. The above controlled template controlled means, as previously mentioned, is of a well known hydraulically actuated type whereby transverse and vertical feed of the tool occurs in inverse ratio in response to movement of the movable element and roller 83 of the rotor template tracer valve 73 so that the cutting tool 89 exactly follows movement of the tracer valve roller 83 in a well known manner.

Figure 16:
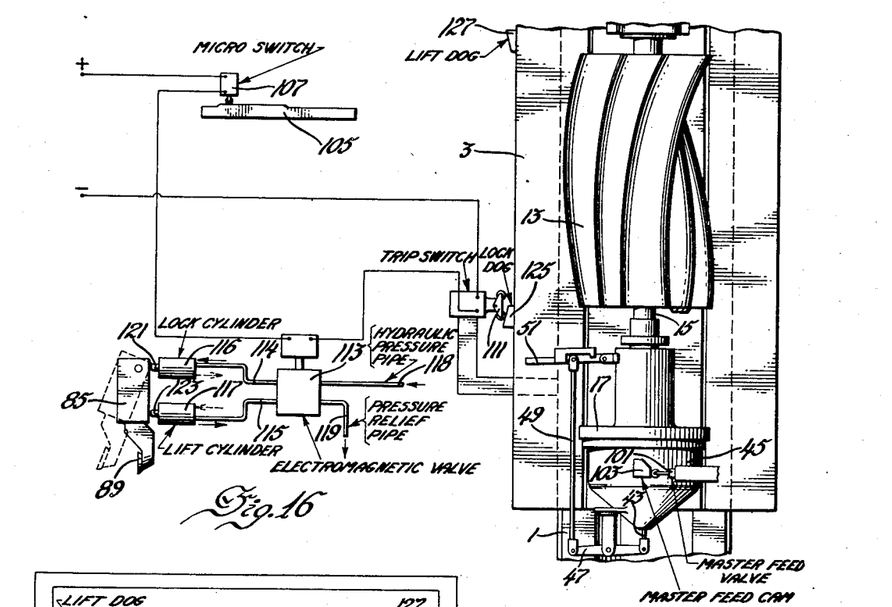
Figure 16 is a schematic diagram of certain of the control connections and machine control elements shown in Figures 1 to 10.

As best shown in Figure 16 a master feed control valve 101 is connected by suitable connections, not shown, to the hydraulic template controlled tool feed means to render it operative only momentarily after the finish and before the start of the cutting stroke of the table 3. A master feed cam 103 is secured to the headstock housing 17 and momentarily contacts and operates the master feed control valve 101 only after the finish and before the start of the cutting stroke of the table to cause momentary operation of the tool feed mechanism at this time only.

In forming right and left-hand helical rotor surfaces on the workpiece 13 it is necessary to prevent the workpiece from striking the cutting tool 89 when the table 3 moves on the return or non-cutting stroke so that a perfectly smooth surface is formed on the workpiece. In forming right-hand rotors this striking tendency between the workpiece and cutting tool occurs on each return stroke of the table only during the first half of the transverse feed stroke of the tool and during the last half of this stroke when forming left-hand rotors. In order to prevent striking of the tool by the workpiece on the return or non-cutting stroke the following control means is provided to tilt the clapper box 85 outwardly at the bottom relative to its pivotal connection 86 on the tool slide 11 and thereby move the cutting tool 89 upwardly away from the workpiece.

Figure 3:
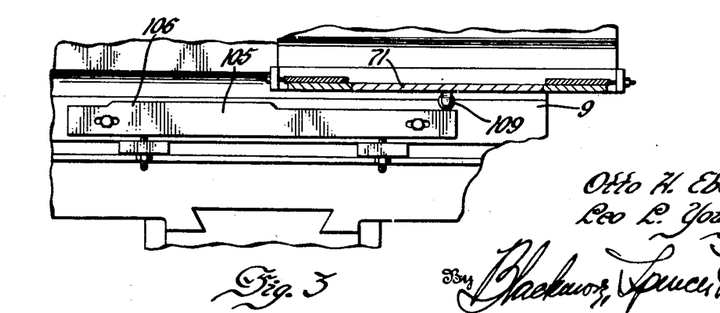
Figure 3 is a sectional view taken on lines 3—3 of Figure 2 with parts broken away to show certain details to better advantage.
Figure 4:
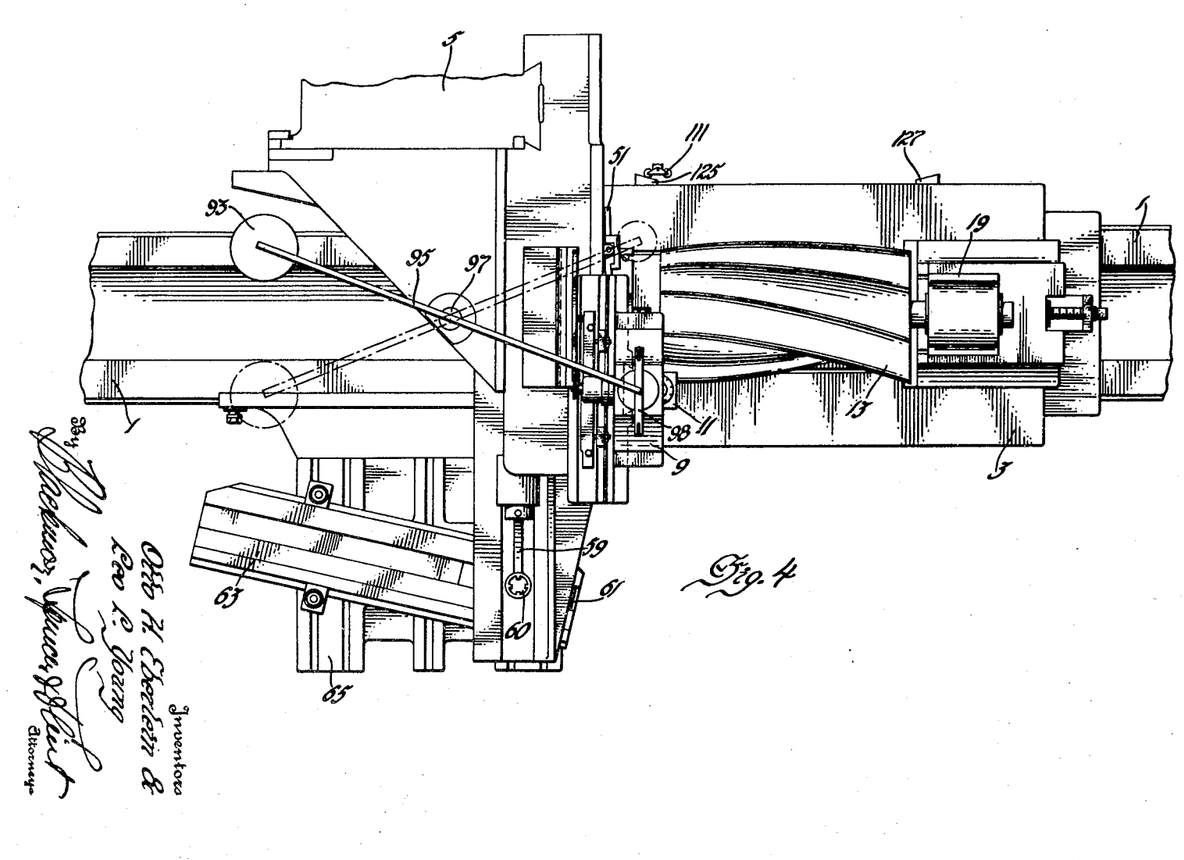
Figure 4 is a top plan view of the machine shown in Figures 1 and 2.

This clapper box controlling means comprises a cam plate 105, shown best in Figures 3, 9 and 16, secured on the saddle 9 and having a cam lift portion 106 extending substantially half its length. The cam plate 105 is secured to the saddle 9 in the position shown in the various figures for forming right-hand helical rotor surfaces and is secured thereto in an opposite end to end relation when left-hand helical rotor surfaces are to be formed. A microswitch 107 is secured to the rotor template bracket 72 and has a movable element supporting a follower roller 109 which continuously engages the cam plate. The microswitch is moved to a closed circuit position when the follower roller 109 is in contact with the lift portion 106 of the cam plate 105. As best shown schematically in Figure 16 the microswitch 107 is connected in series electrical relation with a trip switch 111 and an electromagnetic valve 113 across a source of electrical power. Separate hydraulic application and relief pipes 114 and 115 are shown connected between the valve 113 and separate cylinder cavities 116 and 117 provided in the tool slide 11 above and below the point of pivotal connection of the clapper box 85 therewith. A pressure supply pipe 118 and a relief pipe 119 respectively connects the valve 113 to a source of hydraulic pressure and to a pressure relief cavity not shown. As best illustrated in Figure 9 a clapper box lock plunger 121 is slidable in the upper lock cylinder cavity 116 and a clapper box lift plunger 123 is slidable in the lower lift cylinder cavity 117. The electromagnetic valve when deenergized causes pressure to be continuously applied through the pipe 114 to the lock plunger 121 and to relieve pressure from the lift plunger 123 by means of the pipe 115 in order to lock the clapper box 85 and cutting tool 89 in the cutting position shown on the tool slide 11. Energization of the valve 113 causes pressure to be relieved from the lock plunger 121 by means of the pipe 114 and causes application of pressure to the lift plunger 123 through the pipe 115 to cause the clapper box 85 to be lifted outwardly at the bottom and lift the cutting tool 89 away from the workpiece 13.

The trip switch 111 is secured by a suitable bracket to the bed 1 adjacent the column 5 and is provided with a movable element which is tripped to the locked and open circuit position by a lock dog 125 secured to the table after the finish of the cutting stroke of the table 3 and is tripped to the lift and closed circuit position by a lift dog 127 also secured to the table, after the finish of the return or non-cutting stroke. With the above clapper box arrangement after the finish of the cutting stroke of the table and when saddle 9 and tool 89 is at the start of the transverse feed stroke, as shown in the various figures, the microswitch 107 is closed and the trip switch 111 is open so that the electromagnetic valve 113 is deenergized and the clapper box 85 is hydraulically locked in the cutting position. Movement of the table 3 on the cutting stroke also causes the workpiece to be rotated clockwise by the sine bar follower 61 and the sine template controlled means 57 causes relative movement between parts thereof to compensate for lost motion between or errors in the parts thereof so that the workpiece 13 moves in a helical path relative to the cutting tool which is hydraulically locked in the cutting position until the master feed cam 103 momentarily strikes and operates the master feed valve 101 after the finish of the cutting stroke. This renders the rotor template tracer valve 73 operative momentarily to cause the transverse feed cylinder 79 and piston rod 79' to move the saddle 9 to the right and the vertical feed cylinder 77 and piston rod 77' to move the tool slide 11 vertically in inverse ratio to this transverse movement in response and in follow-up relation with the movement of the roller 83 of the template tracer valve 73. As the cutting tool 89 is of the same diameter as the follower roller 83 the cutting tool is accordingly caused to be adjusted transversely to the right and vertically a slight amount with respect to the table 3 only at the finish of the cutting stroke. At this time the lift dog 127 also trips the trip switch 111 to the lift and closed circuit position and as the microswitch 107 is electrically connected in series therewith and is in the closed circuit position on account of the roller 109 on the movable element thereof being on the left 106 of the cam plate 105 during the first half of the transverse feed stroke of the saddle and tool, the electromagnetic valve 113 is energized. This causes pressure to be applied to the clapper box lift plunger 123 and pressure to be relieved from the lock plunger 121 so that the tool is lifted away from the work during the return stroke of the table.

After the finish of the return stroke and before the start of the cutting stroke the lock dog 125 trips and moves the trip switch 111 to the lock and open circuit position to again cause deenergization of the electromagnetic valve 113 which again causes the clapper box 85 and cutting tool to be locked in the cutting position for the next cutting stroke of the table. This operation continues during the first half of the transverse feed stroke of the saddle and tool. During the last half of this stroke the roller 109 of the microswitch is moved off the lift 106 of the cam plate 105 to open this switch and prevent lift of the clapper box and cutting tool when the trip switch is moved to the lift and closed circuit position after the finish of the cutting stroke as there is then no tendency for the workpiece 13 to strike the cutting tool. The above automatic operation continues until the finish of the transverse feed stroke. The machine operator then stops the table at the finish of the return stroke and causes the return of the saddle to the position it previously occupied at the start of the transverse feed stroke by operation of suitable manual control means, not shown. The operator then releases the indexing means by operating the hand lever 51 and indexes the workpiece manually in the previously described manner.

It will be evident that one-third of the rotor surface is accurately formed automatically in each of the three indexing positions.

The operation is similar to that described above in forming a left-hand helical rotor surface which requires the securing of both the sine template 69 and cam plate 105 to the column 5 and saddle 9, respectively, in the opposite end to end relation and locking the sine bar 63 to the bed in opposite angular relation to that shown for forming a right-hand helical surface. When the cam plate 105 is in opposite end to end position for forming the left-hand helical surface it will be evident that the clapper box 85 is lifted only during the last half of the transverse feed stroke during each return stroke of the table to prevent the workpiece striking the cutting tool.

In Figures 13 to 15 there is illustrated a mechanical anti-back lash means for oscillating the workpiece 13 so that the sine template controlled means 57—67—69 acts to compensate for only the lost motion between the sine bar 63 and follower 61 and errors in setting of the sine bar. This two way anti-back lash means includes two gears 201—203 meshing with the rack 53 in the headstock housing 17. These gears are rotatably supported in side by side relation between end flanges of separate flanged gear supporting members 205—207. The supporting member 205 for the gear 201 is rotatably supported on the mandrel 15 between one of the mandrel bearings and the flange 23 secured on the tapered end of the mandrel and slidably supporting the indexing key 33. The gear supporting member 205 is also provided with an annular flange 209 which also includes three indexing slots 211 spaced 120 degrees apart for entrance of the tapered end indexing key. As best shown in Figure 14 a radial slot 213 is provided in the member 205 and a hub portion 215 is provided thereon on which the other gear supporting member 207 for the other gear 203 is rotatably supported. The supporting member 207 is also provided with a radial slot 217. A roller supporting member 219 is positioned in the radial slots 213—217 of the gear supporting members 205 and 207 and grooved plates 221—223 are secured in enlarged outer end portions of the slots 213—217 of the members 205 and 207 in which the axially spaced legs of a roller supporting member 219 are mounted for radial sliding movement. Two rollers 227—229 are mounted on a pin 231 extending between the legs of the roller supporting member 219 which is urged radially outwardly of the slots 213—217 by springs 233 in the bottom thereof. Each of the rollers 227—229 are urged into contact with separate cam plates 235. Each cam plate 235 is supported in a cavity in one of the gears and each cam plate is located on opposite sides of the radial slots 213—217 of the members 205—207. Each of the cam plates 235 are provided with a cam surface 237, these surfaces extend at a slight angle outwardly toward each other and on which one of the rollers 227—229 bear continuously to apply equal and opposite torque force on the gears 201—203. Each of the gear teeth in a space between adjacent teeth in the rack are accordingly continuously urged apart, one side of a tooth of one gear being urged into contact with one side of a tooth of the rack and the opposite side of a tooth of the other gear being urged with equal and opposite force into contact with the adjacent tooth of the rack. The reaction of this equal and opposite torque force on each of the gears continuously urges the diagonally opposite portions of the rollers supporting legs into contact with complementary portions of the grooved plates 221—223 so that there is never lost motion between the rack and gears or between the roller supporting and gear supporting members. The same sine template controlled means arranged in identical manner as previously described are used with the above described mechanical two-way anti-back lash mechanism.

Figure 10:
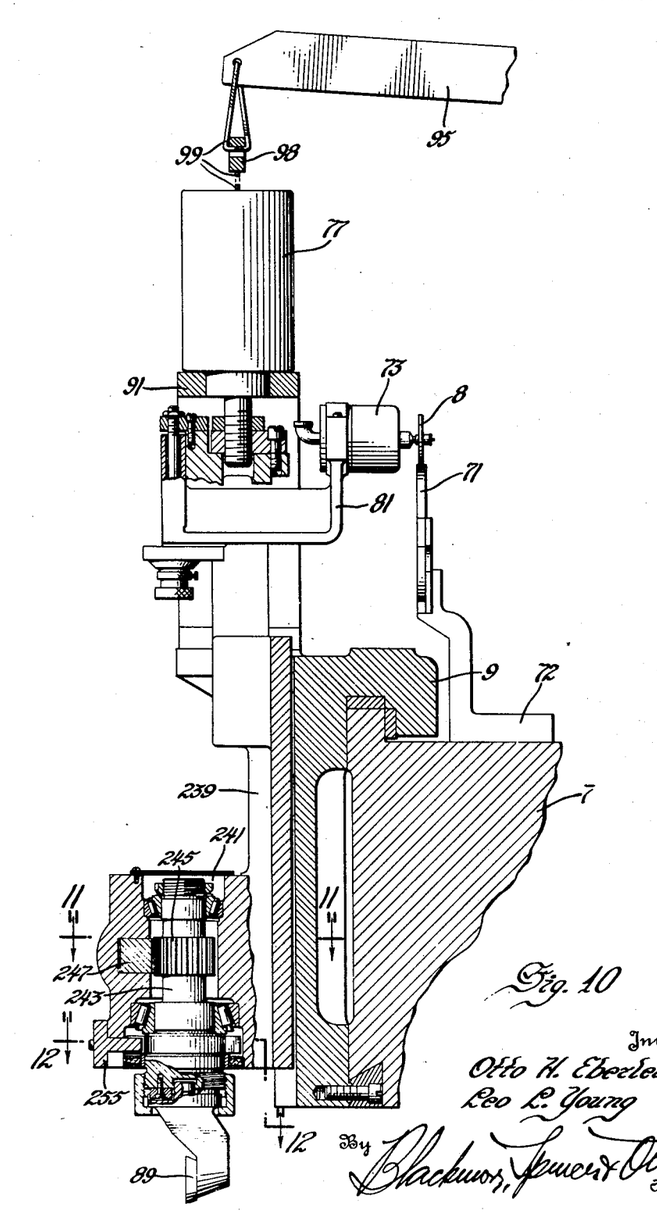
Figure 10 is a view similar to Figure 9 of a modified structure.
Figure 11:
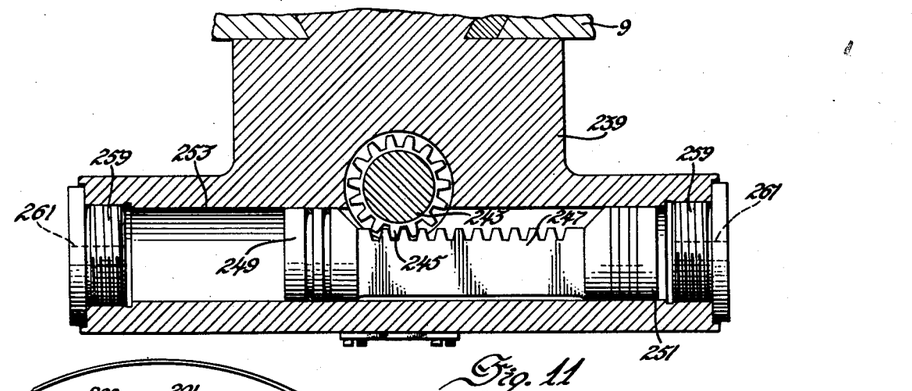
Figure 11 is a sectional view taken on line 11—11 of Figure 10.
Figure 12:
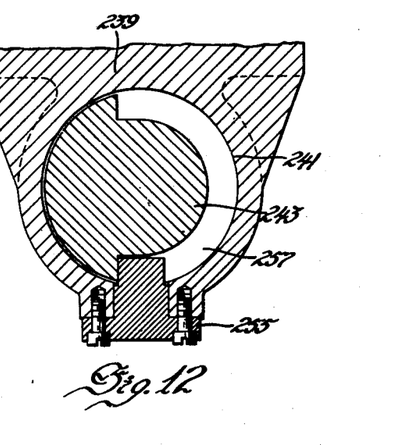
Figure 12 is a sectional view taken on line 12—12 of Figure 10.
Figure 17:
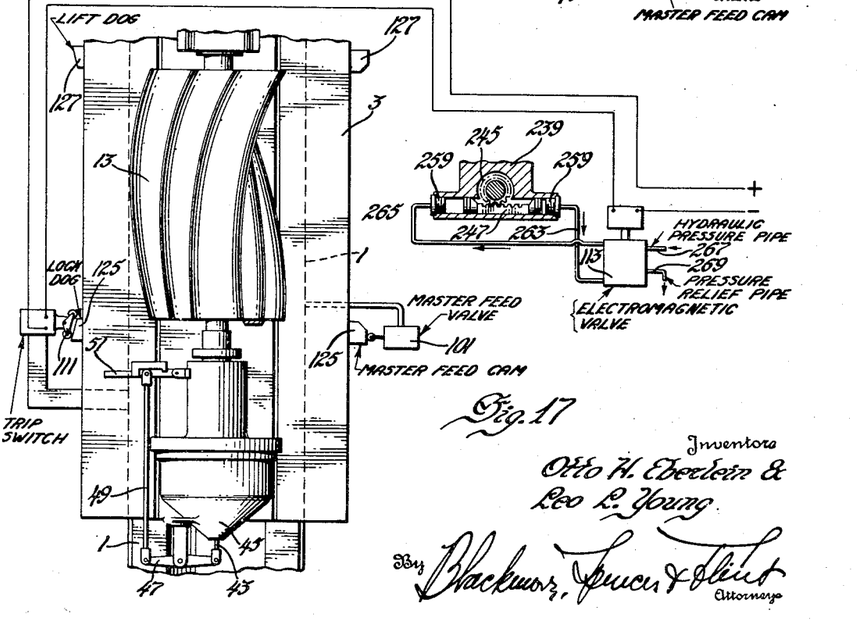
Figure 17 is a schematic diagram of the modified arrangement of machine elements shown in Figures 11–14 and control elements and connections therefor.

In Figures 10 to 12 of the drawings there is illustrated a modified mounting for the cutting tool by which it is oscillated 180 degrees at the finish of each stroke of the table so that each stroke becomes a cutting stroke and the forming operation may be accomplished in half the time required by the single cutting stroke method previously described. As best shown in Figure 10 a tool slide 239 is provided with a vertical bore 241 at its lower extremity in which a tool supporting post 243 is rotatably mounted on two antifriction thrust bearings. The same type of circular cutting tool 89 as previously described is secured to the lower end of the tool post 243 and the tool slide 239 is mounted in the saddle 9 and is counterbalanced in the same manner as previously described. A pinion portion 245 is provided on the tool post between the supporting bearings and a rack 247 having piston portions 249—251 at its opposite ends slidable in a horizontal bore 253 in the tool slide 239 meshes with the pinion portion 245 of the tool post, as best shown in Figures 10 and 11. An abutment or stop 255 secured to the tool slide 239 extends through a radial opening leading to the bore 241 and into a slot 257 extending part way around the tool post in order to limit movement of the post and cutting tool to exactly one-half revolution. The outer ends of the horizontal bore 253 are closed by plugs 259, each having a pressure application and relief opening 261 therein. As best shown schematically in Figure 17, hydraulic pressure application and relief through these openings is controlled by the electromagnetic valve 113 and trip switch 111 and lift and lock dogs 125—127 identical to the ones previously described and mounted on the machine table 3 in identical manner. Separate pressure application and relief pipes 263 and 265 are shown extending between each of the pressure application and relief openings 261 in the plugs 259 to the electromagnetic valve 113 which is connected to a source of hydraulic pressure by a pressure supply pipe 267 and to a relief opening by a relief pipe 269. The trip switch 111 and electromagnetic valve 113 are electrically connected in series across a source of electrical power and it will be evident that the cutting tool will be reversed at the end of each stroke of the table so that each stroke becomes a cutting stroke. As shown in Figure 17, the master feed control valve 101 is secured to the bed of the machine and two lift and lock dogs 125—127 are secured to the table 3 so that the rotor template controlled tool feed means is rendered operative at the end of each stroke of the table by contact of a dog with the master feed control valve in a similar manner as previously described.

We claim:

1. A machine tool having a bed, a table reciprocating thereon, an oscillatable work support on said table, a cutting tool adapted to move relative to said bed in a plane transverse to the path of movement of said table, said tool also movable relative to the plane of adjustment to cutting and non-cutting positions relative to the table movement, hydraulic means for adjusting said tool in said plane, hydraulic means for moving said tool relative to said plane of adjustment to cutting and non-cutting positions, control means for said hydraulic tool adjusting means comprising a template fixed relative to said bed and a template tracer valve movable with the tool to cause the tool to be adjusted in said plane in accordance with the template tracer valve, control means for said hydraulic tool positioning means comprising a cam fixed relative to said bed and cam follower means movable with said tool in one direction in the plane of adjustment thereof and operatively connected to said hydraulic tool positioning means to cause said tool to be moved to cutting and non-cutting positions, master control means associated with said table and said bed for rendering said hydraulic tool adjusting means momentarily operative at the end of at least one stroke of the table and for rendering the hydraulic tool positioning means operative during at least one stroke of said machine to cause movement of said tool to a cutting position, anti-back lash oscillating means for said work support for causing oscillation thereof in timed relation with said table, said last named means comprising a sine bar fixed relative to said table, a sine bar follower means movable on said table including a two-way hydraulic anti-back lash mechanism having one element thereof operatively connected to said support and control means for said hydraulic mechanism comprising a sine template fixed relative to said bed and a sine template tracer valve movable with said element of said mechanism.

2. A machine tool having a bed, a table reciprocating thereon, a rotatable work support including indexing means on said table, a cutting tool movable relative to said bed in a plane transverse to path of movement of said table, said tool being also movable relative to the plane of adjustment and said bed to a different cutting position for each stroke of said table, hydraulic tool adjusting means, a template in fixed position relative to said bed, a template tracer valve movable with said tool for controlling said hydraulic means to cause movement of said tool in said plane, a second hydraulic means for causing movement of said tool to each of said cutting positions, a cam fixed relative to said bed, cam follower control means movable with said tool in one direction in said plane of tool adjustment for controlling the hydraulic means to position said tool in either of said cutting positions, master control means comprising means fixed relative to said bed and means movable with said table for rendering both said hydraulic tool adjusting means operative momentarily at the end of each stroke of said table and said hydraulic tool positioning means operative at the finish of each stroke of said table, means for causing oscillation of said support in timed relation with said table, said last named means comprising a sine bar adjustably fixed on said bed, sine bar follower means slidable on said table and including a two-way anti-back lash hydraulic mechanism, two-way mechanical anti-back lash means connected between one element of said hydraulic anti-back lash mechanism and said support and control means for said hydraulic mechanism comprising a sine template adapted to be secured to said bed in either of two positions and a sine template tracer valve movable with said element of said hydraulic mechanism.

3. A machine tool having a bed, a table reciprocating thereon, an oscillatable work support including indexing means on said table, a cutting tool movable relative to said bed in a plane transverse to the path of movement of said table, said tool being movable relative to said table to a cutting and a non-cutting position, hydraulic tool adjusting means, hydraulic tool positioning means, control means for said hydraulic tool adjusting means comprising a template fixed relative to said bed and a template tracer valve movable with said tool to cause adjustment of the tool in said plane of adjustment, control means for said hydraulic tool positioning means comprising a cam plate adapted to be secured in fixed positions relative to said bed and cam follower control means movable with said tool in one direction of movement in the plane of adjustment thereof for causing movement of the tool to a cutting and a non-cutting position, master control means for both of said hydraulic means comprising means movable with said table and means cooperating therewith fixed to said bed for rendering said tool positioning means operative to cause said tool to be moved to a cutting position for one stroke of the table and to cause movement of said tool to a non-cutting position on the return stroke of said table and for rendering said tool adjusting means operative momentarily at the finish of the cutting stroke of said table, means for causing damped oscillation of said support in timed relation with said table, said last named means comprising friction means between said support and said table, a sine bar on said bed, sine bar follower means slidable on said table and including hydraulic anti-back lash mechanism having one element thereof operatively connected to said support and means for controlling operation of said hydraulic mechanism comprising a sine template on said bed and a sine template tracer valve connected with said mechanism.

4. In a machine tool having a reciprocating table, an oscillatable work support thereon, a stationary sine bar, sine bar follower means on said table including hydraulic anti-back lash mechanism comprising two relatively movable elements, one element of which being operatively connected to said follower means and the other element of which being operatively connected to said work support and control means for said mechanism comprising a stationary sine template and a template tracer valve on said element of said mechanism connected to said support to cause oscillation thereof in timed relation with said table.

5. In a machine tool having a reciprocating table, an oscillatable work support thereon, friction means between said table and said support, a stationary sine bar, sine bar follower means on said table including a two element hydraulic anti-back lash mechanism adapted to act for both directions of movement and having one element operatively connected to said follower means and the other element operatively connected to said support to cause oscillation thereof in timed relation with said table by preventing back lash in said follower means and its connection to said support, and control means for said mechanism including a stationary sine template and a template tracer valve on said element of said mechanism connected to said support.

6. In a machine tool having a reciprocating table, a rotatable work support thereon, indexing means between said table and said support, a stationary sine bar, sine bar follower means on said table including a two element hydraulically extensible and contractible anti-back lash mechanism, one element of which is operatively connected to said follower means and the other element of which is connected to said support to cause oscillation thereof in phase with said table, and control means for said mechanism including a stationary sine template and a template tracer valve for controlling said mechanism.

7. In a machine tool having a bed, a reciprocating table thereon, a rotatable work support on the table including indexing means, adjustable sine bar means on said bed, sine bar follower means on said table including two-way hydraulic anti-back lash means having two elements, one element thereof being operatively connected to said follower means and the other element thereof being operatively connected to said support to prevent lost motion between said follower means and said support to cause oscillation in phase with said table and control means for said hydraulic mechanism including a reversible sine template on said bed and a template tracer valve of said element of said hydraulic mechanism.

8. In a machine tool having a reciprocating table, an oscillatable work support thereon, a stationary sine bar, sine bar follower means on said table, mechanical anti-back lash connecting means on said support, two-way hydraulic anti-back lash means comprising two relatively movable elements, one element thereof connected to said follower means and the other element in engagement with said mechanical anti-back lash connecting means and control means for said hydraulic means including a stationary sine template and a template tracer valve carried by said element of said hydraulic mechanism in engagement with said mechanical anti-back lash connecting means to prevent back-lash in said follower means so that said support is oscillated in phase with said table.

9. A machine tool having a bed, a table reciprocating thereon, a cutting tool adjustable relative to the bed in a plane at an angle to the reciprocating movement of said table, template controlled means for adjusting said cutting tool, an oscillatable work supporting means on said table, a sine bar on said bed, sine bar follower means on said table including a two-way hydraulic anti-back lash mechanism having one element operatively connected to said support to cause oscillation thereof in phase with said table, control means for said mechanism comprising a sine template on said bed, and a template tracer valve for said mechanism supported on said element thereof, and control means operable only upon reversal of said table to render said template controlled tool adjusting means operative.

10. A machine tool having a bed, a table reciprocating thereon, a cutting tool adjustable relative to the bed in a plane at an angle to the table movement and movable angularly with respect to the plane of adjustment, template controlled means for adjusting and moving said tool, an oscillatable work support on said table, a sine bar on said bed, sine bar follower means on said table including a two-way hydraulic anti-back lash mechanism having one element operatively connected to said support for oscillation thereof in phase relation with said table, control means for said mechanism including a sine template on said bed and a template tracer valve on said element of said mechanism and control means operative upon reversal of said table for rendering said template controlled tool adjusting and moving means operative.

OTTO H. EBERLEIN.
LEO L. YOUNG.

REFERENCES CITED

The following references are of record in the file of this patent:

UNITED STATES PATENTS

| Number | Name | Date |
|---|---|---|
| 2,003,936 | Hucal | June 4, 1935 |
| 2,330,921 | Rickenmann | Oct. 5, 1943 |

FOREIGN PATENTS

| Number | Country | Date |
|---|---|---|
| 439,956 | Great Britain | Dec. 16, 1935 |

Certificate of Correction

Patent No. 2,485,716                                                October 25, 1949

OTTO H. EBERLEIN ET AL.

It is hereby certified that errors appear in the printed specification of the above numbered patent requiring correction as follows:

Column 3, line 37, strike out the words "is mounted for transverse sliding movement in a"; line 66, after "follower" insert *slide*;

and that the said Letters Patent should be read with these corrections therein that the same may conform to the record of the case in the Patent Office.

Signed and sealed this 13th day of June, A. D. 1950.

[SEAL]

THOMAS F. MURPHY,
*Assistant Commissioner of Patents.*